Figure 1:
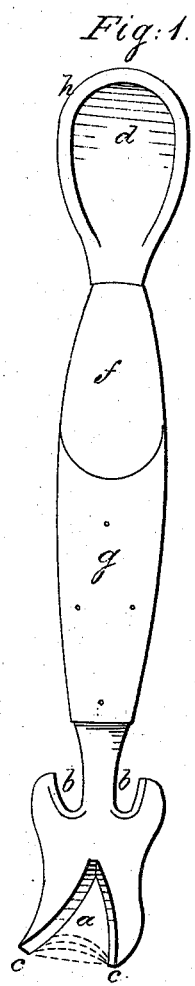

F. FULLER.
Garden Implement.

No. 81,619.

Patented Sept. 1, 1868.

Witnesses:
L. A. Morre
Mich. Connolly

Inventor:
Frank Fuller

United States Patent Office.

FRANK FULLER, OF NEW YORK, N. Y.

Letters Patent No. 81,619, dated September 1, 1868; antedated May 5, 1868.

IMPROVEMENT IN GARDEN-IMPLEMENTS.

*The Schedule referred to in these Letters Patent and making part of the same.*

TO ALL WHOM IT MAY CONCERN:

Be it known that I, FRANK FULLER, of the city, county, and State of New York, have invented a new and useful Garden-Implement, which I denominate "The Universal Gardener," in which are combined the advantages of the numerous garden-tools now in use; and I declare the following to be a full, clear, and exact description thereof, reference being had to the accompanying drawings, which are lettered to correspond with and form a part of this specification.

The object of my invention is to produce a universal garden-tool, which can be afforded at little cost, and which may be used among small and delicate plants, in weeding, in agitating the soil, in pruning, in thinning out plants, in transplanting them, in removing fruit (as grapes in clusters) from the vine, in plucking flowers, and for a great variety of purposes in which the use of larger implements would endanger the plants under cultivation. It is also my object to supply a well-nigh universal want experienced by ladies who cultivate flowers and other plants in beds or pots, and for whose use no elegant implement, combining the advantages of the hoe, the spade, the drill, the rake, the trimmer and pruner, and the flower and fruit-gatherer, has ever before been devised.

With all these advantages, I combine a novel and useful feature, which will not fail to commend "The Universal Gardener" to ladies, as well as to all who engage in horticulture or fruit-culture as a pastime, and who, being unaccustomed to contact with harsh or injurious substances, would seek to protect their hands from injury or from being soiled. In using it as a weeder, or as a flower and fruit-gatherer, the only portion of the hand which would be soiled or lacerated is the thumb; and this is provided with a shield of flexible India rubber, or other suitable material, which completely protects it.

In using "The Universal Gardener," only one hand is employed; and thus, when fruit or flowers are gathered by its aid, the other hand remains free to receive them, or to hold the basket or other receptacle in which they are deposited.

Every farmer, gardener, or horticulturist, every lady in city or country who devotes an occasional hour to the care of flowering or fruit-bearing shrubs, vines, or plants, every child who delights in the possession of a garden-patch, however small, will find in this beautiful little implement an ever-ready companion and friend, while its use in the conservatory or hot-house will become an absolute necessity. It essentially lessens the labor of fruit and flower-culture, and provides immunity from the exhaustion which is apt to accompany this otherwise delightful exercise.

It is made of the choicest materials. It will last for years, and if properly used can never get out of order. It can be carried in the pocket. It is unique in form and ornamental in design, while the low price at which it is sold, places it within the reach of all. No prettier or more useful gift could be selected for a lady or child, and no present of equal cost would prove equally acceptable.

It is intended to manufacture these beautiful instruments by the million, and to furnish them to every household in the United States; and it is fair to conclude that by thus supplying the means for the cultivation of useful and beautiful plants, trees, and shrubs, a new love for those "Floral apostles, that, in dewy splendor,
Weep without woe, and blush without a crime,"

will be developed, encouraged, stimulated, and that the sum of human happiness will thereby be increased.

To enable the public to understand the construction of "The Universal Gardener," and those skilled in the mechanic arts to manufacture it, I will proceed to describe it.

Figure 1 shows one form of the "gardener" in its completed state.

A plate of the finest steel is stamped, forged, or swaged into the general form here shown, and is afterwards supplied with a neat handle, *g*, of ornamental wood, or other suitable material, as well as with the elastic shield *f*. At *a* the steel is bifurcated or swallow-tailed, and its inner surfaces are bevelled to a cutting-edge. The points *c c* of the bifurcated points are carefully rounded and polished, so as to present no lacerating-point or cutting-edge when the implement is in use. The bifurcated points are then slightly curved, so that the bark of a tree or shrub shall not be punctured or impaired in the act of pruning.

I do not confine myself to the precise form of pruning-chisel shown in fig. 1, although this form provides longer cutting-edges, and, in use, secures a firmer hold upon the shoot to be severed. The dotted lines at $i$ exhibit several modifications which may be employed.

The "gardener" is so formed as to afford additional pruning-knives or loops at $b\ b$, with similar bevelled or chisel-edges, which enables the operator to use it either by pushing or pulling, whether in pruning or trimming, or in cutting up weeds, stalks, and stems, which are deemed unsightly or objectionable, which knives or loops can be increased in number, if desired. These loops encircle the stems or shoots which it is deemed desirable to destroy, and a slight drawing movement insures their being severed by the sharp blades.

At $d$, fig. 1, the shield or thumb-stall $f$, of India rubber, or other suitable material, is thrown back, and exhibits the bowl or interior of that portion of the "gardener" which is designed for those uses, other than that of a pruning-knife, which have been hereinbefore enumerated. The centre of the extremity, $d$, is depressed to a spoon-like or concavo-convex form, and its periphery, $h$, is ground to an edge.

Figure 3:

Figure 3 exhibits this same bowl slotted, which form of construction adapts it to the purposes of a fork, to be used in removing delicate plants from the soil when it is desired to transplant them, and also to the purposes of a rake, the teeth or tines being somewhat convex.

Figure 2:
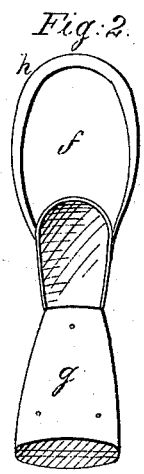

Figure 2 shows the bowl without the slots, and with the shield lying in position therein.

In using the "gardener" as a digger, drill, spade, hoe, fork, rake, &c., the shield is unnecessary, and is, therefore, drawn back or inverted over the handle, as shown in figs. 1 and 3, and is grasped along with the handle by the hand. The great value of the shield becomes apparent, however, when the "gardener" is employed to assist in exterminating weeds, or in plucking fruit and flowers. The handle is grasped, the thumb inserted in the shield, and the weeds or stems are seized between the encased and completely-protected thumb and the slotted or spoon-like bowl, when, by a slight movement of the hand, they are either pulled up or severed at the point of contact with the periphery, as may be desired. Similar protection is afforded to the ball of the thumb by the use of a metallic strip, or a strip of India rubber or other suitable material, or a combination of both, and either with or without the cot-like form.

Having thus sufficiently described my invention to enable a skilful artisan to construct it, and having alluded to a few among its many valuable qualities, what I claim as new, and desire to secure by Letters Patent of the United States, is—

1. A universal garden-implement, having one extremity provided with a chisel-shaped, bifurcated, or other pruning-edge or edges, and the other extremity provided with a forked, spoon-shaped, or other digger, dibble, drill, spade, and flower and fruit-gatherer, the whole constructed substantially as described.

2. Providing said universal garden-implement, or any implement of similar construction, or designed for similar uses, with one or more pruning-loops, $b$, arranged between the two extremities of said implement, substantially as described.

3. Providing a garden-implement with a shield or protector for such portion of the hand as may be most liable to be soiled or injured, said shield being constructed of India rubber, leather, cloth, metal, or any other suitable material.

FRANK FULLER.

Witnesses:
L. A. MOORE,
MICH'L CONNOLLY.